Figure 1:
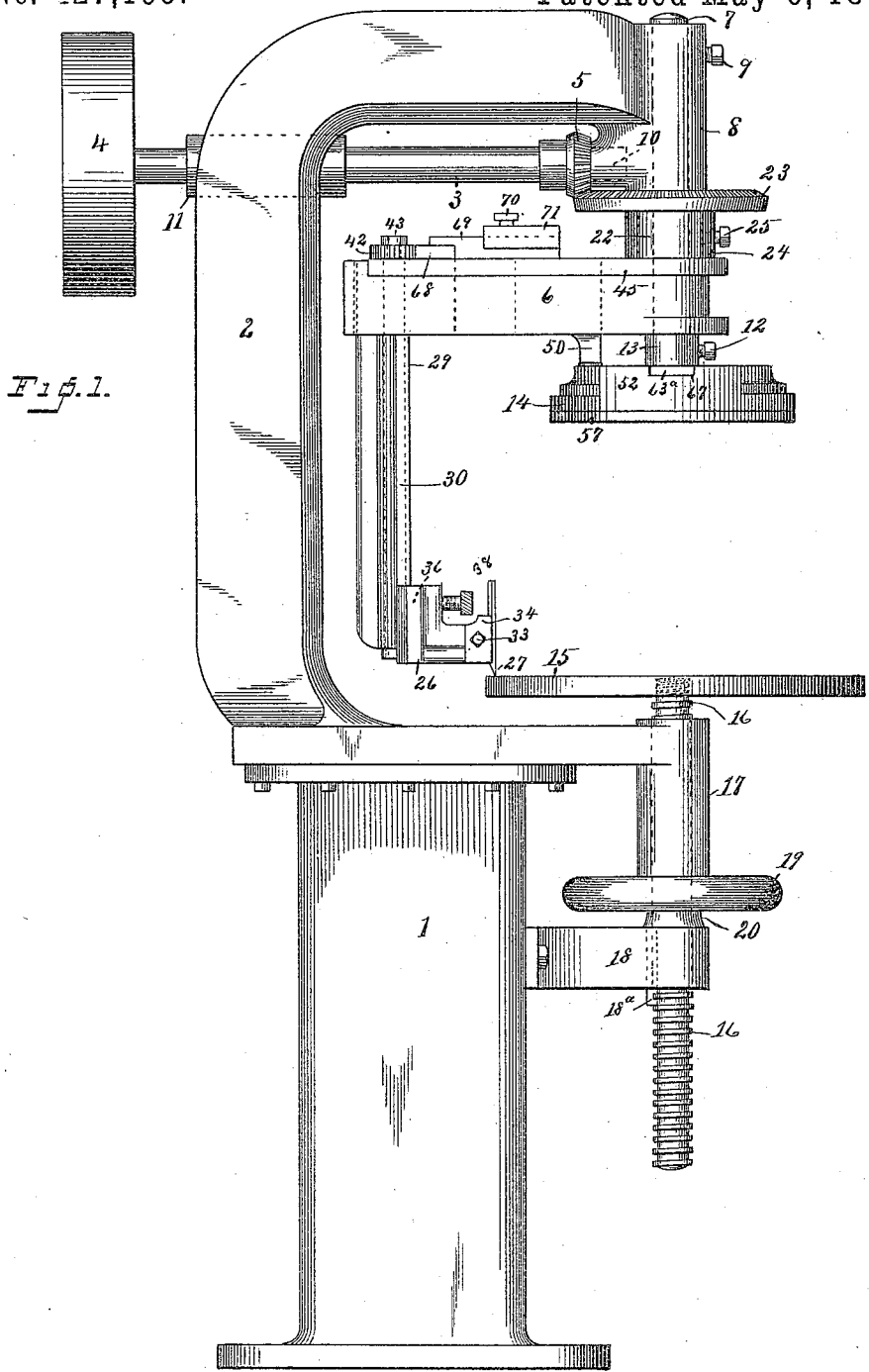

(No Model.) 2 Sheets—Sheet 1.

I. L. SHELDON.
MACHINE FOR CUTTING OUT TOPS AND BOTTOMS OF PASTEBOARD BOXES.

No. 427,199. Patented May 6, 1890.

WITNESSES
C. M. Newman,
Azley P. Munson.

INVENTOR
Irving L. Sheldon
By H. M. Wooster
Atty.

(No Model.) 2 Sheets—Sheet 2.
I. L. SHELDON.
MACHINE FOR CUTTING OUT TOPS AND BOTTOMS OF PASTEBOARD BOXES.
No. 427,199. Patented May 6, 1890.
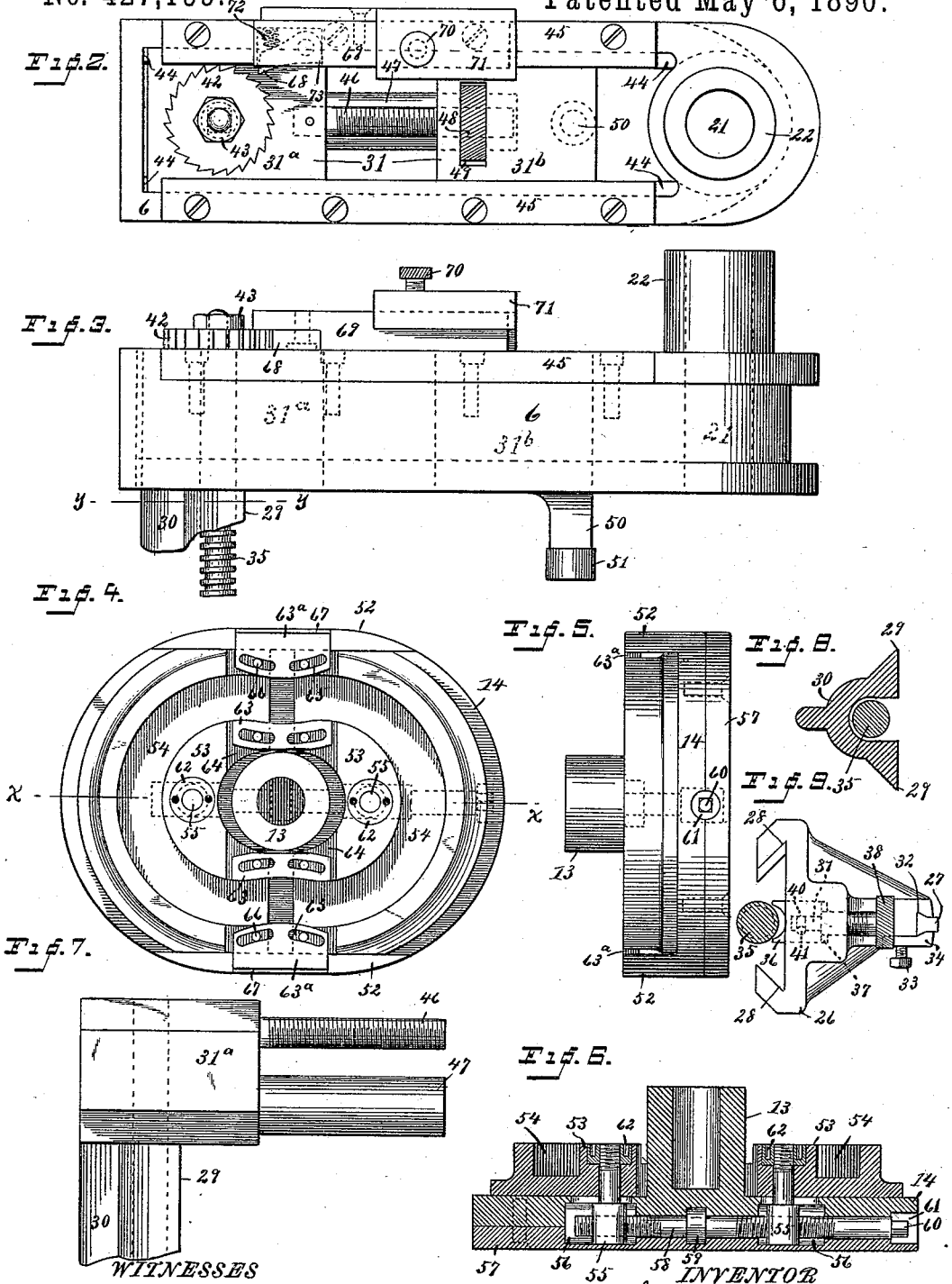
WITNESSES
C. M. Newman,
Azley P. Munson
INVENTOR
Irving L. Sheldon
By A. M. Wooster
Atty.

UNITED STATES PATENT OFFICE.

IRVING L. SHELDON, OF DANBURY, CONNECTICUT.

MACHINE FOR CUTTING OUT TOPS AND BOTTOMS OF PASTEBOARD BOXES.

SPECIFICATION forming part of Letters Patent No. 427,199, dated May 6, 1890.

Application filed December 4, 1889. Serial No. 332,515. (No model.)

*To all whom it may concern:*

Be it known that I, IRVING L. SHELDON, a citizen of the United States, residing at Danbury, in the county of Fairfield and State of Connecticut, have invented certain new and useful Improvements in Machines for Cutting Out Tops and Bottoms of Pasteboard Boxes; and I do hereby declare the following to be a full, clear, and exact description of the invention, such as will enable others skilled in the art to which it appertains to make and use the same.

My invention has for its object the production of a power machine which may be adjusted to cut tops and bottoms of pasteboard boxes of any required size and at a high rate of speed, the operations of feeding the knife downward and cutting being entirely automatic.

With these ends in view I have devised the novel machine of which the following description, in connection with the accompanying drawings, is a specification, numbers being used to denote the several parts.

Figure 1 is an elevation of the machine complete; Fig. 2, a plan view of the cutter-arm detached; Fig. 3, a side elevation of the cutter-arm detached; Fig. 4, a plan view of the shaping-head detached; Fig. 5, an end elevation corresponding with Fig. 4; Fig. 6, a longitudinal section of the shaping-head on the line $x\,x$ in Fig. 4; Fig. 7, a view of a portion of the slide detached; Fig. 8, a cross-section of the cutter-head carrier on the line $y\,y$ in Fig. 3; and Fig. 9 is a plan view of the cutter-head detached.

1 denotes the pedestal, and 2 an arm rigidly bolted thereto, by which all of the operative parts of the machine are carried. It will of course be understood that the design of these parts is not an essential feature of the machine, and may be varied to suit the taste of the builder.

3 denotes the shaft, which is journaled at the upper end of the arm, and is provided at its outer end with a belt-pulley 4, by which power is applied, and at its inner end with a bevel-pinion 5, by which motion is communicated to the cutter-arm 6, as will presently be fully explained. At the outer end of the arm 2 is a stud 7, which I preferably make separate from the arm and secure in a sleeve 8 by means of a set-screw 9. This sleeve is cast integral with the arm, and is preferably provided with a socket 10 to receive the inner end of shaft 3, (see dotted lines, Fig 1,) the outer end of said shaft being shown as journaled in a sleeve 11, which is itself socketed in the arm, as shown by dotted lines in Fig. 1. The shaping-head is rigidly secured at the lower end of stud 7 by means of a set-screw 12, which passes through a collar 13, cast integral with the main plate 14 of the shaping-head, and locks the entire head firmly in place.

In order that the machine may be readily understood, I will describe the cutting mechanism before describing the shaping mechanism in detail. The pasteboard blanks from which the tops and bottoms are cut may be rectangular or any other shape. They are of course cut in the first instance to make as little waste as possible in shaping.

15 denotes a table, which may be round or oval, as preferred, and is carried by a screw 16, to which it is rigidly secured. This screw passes loosely through a sleeve 17 on arm 2, and also loosely through an arm 18, bolted to the pedestal and projecting outward therefrom, and is provided with a groove its entire length, which is engaged by a spline $18^a$ in arm 18.

19 denotes a hand-wheel, which is threaded to correspond with the thread of the screw, and rests upon a boss 20 on arm 18, lying between said boss and the lower end of sleeve 17. It will be seen that when the hand-wheel is rotated the screw is necessarily moved upward or downward and carries the table with it, spline $18^a$ acting to hold the screw against rotation and to retain the table in proper position relatively to the shaping-head. In use a pile of blanks—several dozen at a time—is placed upon the table, and the hand-wheel is rotated to raise the table until the pile of blanks thereon are firmly clamped between the table and the under side of the shaping-head. In practice the entire space between the table, in the position shown in Fig. 1, and the shaping-head may be filled with a solid mass of blanks. The inner end of the cutter-arm is provided with a hole 21, through which stud 7 passes, said arm turning freely on the stud. I preferably provide the cutter-arm with a sleeve 22, through which the stud passes, the weight of the cutter-arm resting upon collar 13 on the shaping-head. The rotation of the cutter-arm may of course be produced in any suitable manner. I preferably produce it by means of a bevel-gear 23, which meshes with bevel-pinion 5 on the shaft. This gear is shown as provided on its under side with a sleeve 24, which slips over sleeve 22 on the cutter-arm, and is rigidly locked thereto by means of a set-screw 25. It will thus be seen that when rotation is imparted to the bevel-gear the cutter-arm must necessarily be carried thereby.

26 denotes the cutter-head, and 27 the cutter which is carried thereby. The cutter-head is provided with an undercut groove 28, to adapt it to slide upon corresponding ways 29 upon the cutter-head carrier 30, the latter being rigidly secured to or cast integral with a portion of adjustable slide 31, which is adapted to reciprocate in the cutter-arm, as will presently be fully explained. The back of the cutter is provided with a dovetail to adapt it to be adjusted vertically in a groove 32 in the cutter-head. The cutter is held firmly in place by a side plate 34 and set-screw 33, which passes through the side plate and engages the body of the cutter-head. Within the cutter-head carrier is a feed-screw 35, the thread of which is adapted to be engaged by a slide 36 in the cutter-head. This slide is loosely socketed in a recess 37 in the cutter-head, its forward end being a concave curve to adapt it to engage the thread of the feed-screw.

In order that the cutter-head may be raised or lowered on the cutter-head carrier independently of the feed-screw, I provide a thumb-screw 38 in the cutter-head, the threaded body of which engages the cutter-head. At the forward end of this screw is a reduced portion 39, (see dotted lines, Fig. 9,) which extends into a hole in slide 36 and is provided with a peripheral groove 40. A pin 41, driven through the cutter-head and engaging the groove, secures the slide to the reduced portion of the thumb-screw in such a manner that when said screw is turned forward the slide is forced outward and the curved forward end thereof placed in engagement with the thread of the feed-screw, and when the thumb-screw is turned backward the slide is drawn out of engagement with the thread of the feed-screw, so that the cutter-head may be moved upward or downward on the cutter-head carrier independently of the feed-screw. The feed-screw lies loosely in the cutter-head carrier and extends upward loosely through the slide, the upper end of said screw being squared to receive a ratchet 42, which is held securely in position by a nut 43 engaging the reduced and threaded outer end of the feed-screw.

Slide 31 may be of any suitable or preferred construction. It is necessary that it should be adjustable as to length, so as to enable the operator to adjust the cutter in or out, as may be required in cutting different sizes of box tops and bottoms.

In the present instance I have shown the slide as consisting of two independent parts, the outer of which I designate for convenience $31^a$ and the inner part $31^b$. The slide rests upon flanges 44, cast upon the inner side of the cutter-arm, and is held in position by plates 45, screwed to the top of the arm. The inner part of the slide is provided with sockets (see dotted lines, Fig. 2) to receive loosely rods 46 and 47, which project inward from the outer part thereof, (denoted by $31^a$.) The upper rod, which I have denoted by 46, is threaded, and is engaged by a threaded nut 48, lying in a socket 49 in the inner part of the slide. It will be seen that rotation of said nut must either draw the two parts of the slide closer together or else force them apart. Upon the under side of part $31^b$ is a stud 50, having at its lower end an anti-friction roller 51, which is adapted to engage a cam-groove in the shaping-head, by which the shape of the blanks is determined, as will presently be fully explained. It will be seen, therefore, the cutter being carried by the slide, and the latter, in addition to being carried around by the cutter-arm, being caused to reciprocate through the engagement of stud 50 with the cam-groove in the shaping-head, that the blanks produced by the cutter must correspond in shape with the outline of the cam-groove, and that adjustment of the cutter in or out by lengthening or shortening the slide must change the size of the blanks produced, but without changing their relative shape in the slightest.

The construction of the shaping-head is clearly shown in Figs. 4, 5, and 6. The main plate, which is denoted by 14, is provided with side flanges 52. Lying between these side flanges and supported by the main plate are two plates 53, which I term "shaping-plates." These plates are each provided with a semicircular groove 54, the ends of the grooves being toward each other, so that when the inner ends of said plates are in contact a complete elliptical cam-groove is formed for the anti-friction roller to travel in, the two semicircular grooves being so laid out as to cause the cutter to trace the desired curves required at the ends of the tops and bottoms of boxes, more especially hat-boxes, and also the straight portions at the sides thereof. The various changes in the shapes of tops and bottoms of boxes to accommodate different sizes and styles of hats are made by varying the long diameter of the elliptical blanks therefor without changing the curves at the ends, or by enlarging the blanks in the manner already described, either with or without a relative change in the long diameter thereof.

In order that I may be enabled to change the long diameter of the blanks at any time, I provide each of the shaping-plates with downwardly-extending studs 55, which lie in recesses 56, formed in the main plate of the shaping-head and in the bottom plate 57, which is secured to the main plate by screws or in any suitable manner. These studs are provided, respectively, with right and left threaded openings adapted to lie in the direction of the long diameter of the shaping-head. These openings in the studs are engaged, respectively, by right and left threaded portions of an adjusting-screw 58, this screw being held against endwise movement by an enlargement 59, which lies in corresponding recesses in the main plate and lower plate. One end of the adjusting-screw extends outward and is provided with a squared end 60, which lies in a recess 61 in the end of the shaping-head, as is clearly shown. For convenience in assembling, the upper ends of studs 55 are threaded and are engaged by sunken nuts 62 in the top of the shaping-plates. (See Figs. 4 and 6.) In order, therefore, to change the long diameter of the blanks formed by the cutter, it is simply necessary to rotate the adjusting-screw to move the shaping-plates toward or from each other, as may be required.

In order that the sides of the blanks will be straight and parallel, it is necessary that the grooves in the shaping-plates by which the movement of the cutter is controlled should curve inward more or less at the sides. This I accomplish by curving inward slightly the ends of the semicircular grooves in the shaping-plates, and by providing inner and outer side plates, (denoted, respectively, by 63 and 63ª,) which lie in a transverse groove 64, formed in the respective inner ends of the shaping-plates. The operative faces of the outer side plates are convex curves, and the operative faces of the inner side plates are concave curves, as is clearly shown in Fig. 4. Each of the side plates is provided with slots 65, which correspond with the curvature of the operative faces of said plates, and are engaged by pins 66, projecting upward from the bottom of the transverse groove. It will be noticed that the outer side plates are made long enough to extend into transverse grooves 67 in the side flanges, so that these plates, which receive about all the pressure of the anti-friction roller in use, are held firmly against lateral displacement. It will be apparent from Fig. 4 that when the shaping-plates are moved inward toward each other the pins holding the outer side plates will ride down the inclines and carry the side plates outward, and that when the shaping-plates are moved away from each other to lengthen the long diameter of the blanks formed by the cutter the pins will ride up the inclines, which will draw the side plates inward, and will throw the convex curves of the outer side plates into the track of the anti-friction roller, causing it to move inward slightly, as is required to give flat sides to the blanks when the long diameter is increased.

It will be apparent from what has already been said that any desired adjustment of the cutter to produce any required oval blank is produced by setting the shaping-plates by means of the adjusting-screw. Having once fixed the adjustment, it need not be disturbed until another style of blanks is required.

In use, as the cutter-arm rotates, slide 31 will reciprocate backward and forward through the engagement of stud 50 or the anti-friction roller thereon with the groove in the shaping-head. This will cause the cutter, which must move with the cutter-arm, to travel around the pile of blanks upon the table, the line of travel of the cutter being an enlargement of the elliptical oval of the cam-groove in the shaping-head.

The downward feed of the knife may be accomplished in any ordinary simple manner. I preferably produce this movement by means of a feed-pawl 68, socketed in a plate 69, which is locked at any desired adjustment upon the cutter-arm by means of a set-screw 70, which passes through a plate 71, which is itself firmly screwed to the cutter-arm. The pawl is forced forward into operative position by means of a spring 72, its outward movement being stopped by a shoulder 73 on the pawl itself, (see dotted lines, Fig. 2) which engages the wall of the recess within which the pawl is pivoted, the recess, spring, body of the feed-pawl, and shoulder being shown only in dotted lines in Fig. 2. As the slide moves inward when stud 50 travels down the sides of the cam-groove, ratchet 42 is also moved inward and forced into engagement with the feed-pawl, the ratchet being moved forward one or more teeth, according to the adjustment of the plate by which the pawl is carried. Slide 36 in the cutter-head being in engagement with the feed-screw, it follows that the cutter-head and cutter will be moved downward each time a forward movement of the ratchet takes place, there being, in fact, two downward movements of the cutter during each rotation of the cutter-arm—that is to say, the downward movement of the cutter takes place during each period of time that the cutter is traversing a straight side of the pile of blanks.

In practice, in order to insure that the scraps will drop away from the cutter, so as to avoid the possibility of clogging, I make a downward cut with a sharp knife at the ends and sides of the pile of blanks upon the table, this cut being made inward just far enough to intersect the line of travel of the cutter, so that the scrap formed by cutting each blank will drop away in quarters.

The operation of the entire machine has been already so fully described in describing the construction and arrangement of parts that further description can hardly be required. It is sufficient to say that a pile of unshaped blanks for tops and bottoms is placed upon the table, and the latter is moved upward by means of the hand-wheel until the pile of blanks is clamped firmly between the table and the shaping-head. The shaping-plates are adjusted to give the required shape of elliptical oval to the finished blanks by means of the adjusting-screw. The slide is lengthened or shortened to cause the cutter to produce blanks of the desired size, and the amount of downward feed imparted to the cutter at each rotation of the cutter-arm is determined by adjustment of the plate carrying the feed-pawl. These adjustments, when once determined, need not be disturbed until the class of work is changed. The machine being adjusted and the pile of unshaped blanks clamped in place, motion is communicated to the machine, as shown, or in any suitable manner, and it is left to do its work, no watching being required, as there is nothing to get out of order. When the entire pile of blanks has been cut, the machine is stopped. The cutter-head and cutter are then raised by hand after disengaging slide 36 from the feed-screw, and the hand-wheel is turned backward to move the table downward. The pile of shaped blanks is then removed and another pile placed upon the table and the operation proceeded with as before.

Having thus described my invention, I claim—

1. The combination, with a table and a shaping-head having a groove, of a rotating cutter-arm having a slide, a cutter carried by said slide, a stud upon said slide adapted to engage said groove, and feeding mechanism, substantially as described and shown, whereby the cutter is fed downward in use.

2. The combination, with a shaping-head, a cutter-arm, and a cutter, substantially as described and shown, of a table to receive the blanks, and a vertically-movable screw by which said table is carried, so that the table may be moved upward to clamp the blanks against the shaping-head.

3. In a machine of the class described, the combination, with a shaping-head having a groove and a rotating arm, of a slide in said arm having a stud engaging said groove, a cutter carried by said slide, and a ratchet, pawl, and feed-screw, whereby the cutter is fed downward in use.

4. The combination, with the shaping-head having a groove and a rotating cutter-arm, of a slide carried by said arm and having a stud engaging said groove, a cutter-head carrier projecting downward from the slide, a cutter, a head which carries the cutter and is adapted to slide on the cutter-head carrier, and a feed-screw engaging the cutter-head, by which the latter is fed downward.

5. The combination, with the cutter, cutter-head, and cutter-head carrier, of a slide by which the latter is carried and which is provided with a stud 50, a shaping-head having a groove which is engaged by said stud, and a rotating cutter-arm by which the slide is carried.

6. In a machine of the class described, the combination, with the cutter-arm and a cutter, of a slide in said arm by which the cutter is carried, a stud projecting downward from said slide, and a shaping-head having a groove engaged by said stud, whereby the shape of the blank produced by the cutter is determined.

7. The combination, with the cutter-arm, the cutter, and a shaping-head having a groove, of a slide having a lug engaging said groove, said slide being made adjustable, so that the cutter may be moved in or out to increase or diminish the size of the blanks produced.

8. In a machine of the class described, the combination, with a rotating cutter-arm and a cutter, of a slide by which the cutter is carried, said slide consisting of parts $31^a$ and $31^b$, one of said parts having a threaded rod and the other a socket to receive it, and a socketed nut engaging the thread upon the rod, so that the parts may be moved toward or from each other.

9. The combination, with a rotating cutter-arm and a slide having a stud 50, of a shaping-head having adjustable shaping-plates, and side plates having convex curves adapted to move out or in as the shaping-plates are moved toward or from each other, so as to cause the cutter to produce blanks having flat sides.

10. The shaping-head consisting, essentially, of shaping-plates having semicircular grooves, side plates having convex operative faces, and slots engaged by pins on the shaping-plates, and an adjusting-screw acting to move the shaping-plates toward or from each other, as and for the purpose set forth.

11. The shaping-head consisting of main and bottom plates having recesses 56, shaping-plates having semicircular grooves, and studs extending downward into said recesses, and an adjusting-screw having right and left threads to engage said studs, respectively, to move the shaping-plates toward or from each other.

12. The combination, with the shaping-plates having semicircular grooves, and pins 66, of side plates $63^a$, having convex operative surfaces, and slots curved to correspond with said surfaces and engaged by said pins, so that when the shaping-plates are moved away from each other the side plates are moved inward, and vice versa, as and for the purpose set forth.

13. The combination, with the shaping-plates having semicircular grooves, and pins 66, of outer and inner side plates having, respectively, convex and concave operative surfaces, and slots curved to correspond with said surfaces and engaged by said pins, said side plates being adapted to move inward when the shaping-plates are moved away from each other, and vice versa, and to form the side portions of the groove which is completed by the grooves in the shaping-plates.

14. The combination, with main plate 14, having side flanges 52, and shaping-plates lying between said flanges and provided with semicircular grooves, of side plates 63ª, having a slotted connection to the shaping-plates, so as to move inward when the latter move outward, said plates serving to connect the grooves in the shaping-plates, studs extending downward from the shaping-plates, and an adjusting-screw having right and left threads to engage said studs, whereby the shape of the groove may be changed.

15. The combination, with the rotating cutter-arm and the slide, of a cutter, cutter-head, cutter-head carrier, a feed-screw, and a slide in the cutter-head adapted to engage said screw, so as to feed the cutter-head and cutter when the feed-screw is rotated.

16. The combination, with the slide, cutter-head carrier, and feed-screw, of a cutter-head adapted to slide on said carrier, a slide 36, adapted to engage said feed-screw, and a thumb-screw adapted to move said slide into and out of engagement, as and for the purpose set forth.

17. The combination, with the cutter, cutter-head, cutter-head carrier, and feed-screw, of a slide 31, by which said parts are carried, a ratchet upon the feed-screw, a rotating cutter-arm by which the slide is carried, and a pawl in said arm adapted to engage the ratchet when the slide is moved inward.

18. The combination, with the cutter-arm having an adjustable spring-actuated pawl, of a slide carrying the cutter-head, a feed-screw engaging the cutter-head, and a ratchet upon the feed-screw adapted to engage the pawl when the slide moves inward.

19. The combination, with the shaping-head having an elliptical groove, and a rotating cutter-arm having a pawl, of a slide carried by the cutter-arm and having a stud engaging the groove, a cutter-head carried by said slide, a feed-screw engaging the cutter-head and having a feed-ratchet adapted to be engaged by the pawl, so that when said stud engages the groove the slide will be moved inward and the ratchet will be turned forward by the pawl to feed the cutter-head downward.

In testimony whereof I affix my signature in presence of two witnesses.

IRVING L. SHELDON.

Witnesses:
GEORGE B. BENJAMIN,
JOHN C. SMITH.